United States Patent Office 3,646,192
Patented Feb. 29, 1972

3,646,192
SILICA GEL STABILIZER FOR SUGAR COATED MULTIVITAMIN TABLETS
Louis Magid, Clifton, N.J., assignor to Hoffmann-La Roche Inc., Nutley, N.J.
No Drawing. Filed June 5, 1969, Ser. No. 830,870
Int. Cl. A61k 9/00, 15/00
U.S. Cl. 424—35                                    4 Claims

ABSTRACT OF THE DISCLOSURE

Sugar coated multivitamin tablets prepared by direct compression containing a high potency of vitamin E are stabilized against cracking and oil bleeding by the inclusion of finely divided silica in the sugar coating.

BACKGROUND OF THE INVENTION

The inclusion of vitamin E active compounds in coated multivitamin tablet formulations has long been recognized in the art as desirable. The inclusion of such compounds, however, has heretofore been restricted by the fact that sugar coated tablets containing such compounds have stability problems. The problem of instability is particularly apparent with formulations requiring from 10 to 30 units of vitamin E per tablet when the basic form of vitamin E utilized is an oily material. The oily vitamin E active compounds have a tendency to bleed out of the tablet and cause cracking of the sugar coating, particularly upon storage. This problem is even more pronounced in multivitamin tablets prepared by direct compression. In accordance with this invention it is now possible to prepare multivitamin tablets by direct compression which contain 10 to 30 units of vitamin E and which are stable against bleeding of oil and cracking of the sugar coating upon storage.

SUMMARY OF THE INVENTION

This invention relates to sugar coated multivitamin tablets prepared by direct compression and containing vitamin E-active materials. More particularly, the present invention relates to sugar coated multivitamin tablets prepared by direct compression containing vitamin E-active materials which are stabilized against cracking of the sugar coat by the inclusion of a small amount of finely divided silica in the outermost sugar coating.

DETAILED DESCRIPTION OF THE INVENTION

Vitamin E comprises a group of seven natural substances known as tocopherols. They are fat soluble, closely related chemical compounds found in vegetable oils such as wheatgerm oil, rice oil, soybean oil and the like. α-Tocopherol has the greatest biological activity of the group while its isomers, beta, gamma, delta, epsilon, zeta and eta tocopherols, have vitamin E activity to a lesser extent. The tocopherols and their esters such as, for example, tocopherol acetate, are normally water-insoluble and of an oily nature. These characteristics limit the admixture of the tocopherols with certain other materials for oral administration, e.g., sugar coated multivitamin tablets. It has been found that sugar coated multivitamin tablets containing high potencies of vitamin E-active materials and which do not crack or bleed oil upon storage can be formed if from about 0.5 percent to about 5 percent weight to volume finely divided silica is incorporated into the sugar syrup utilized to coat the tablets. Surprisingly, only incorporation of the finely divided silica into the outer coating of the tablet is effective in preventing cracking and oil bleeding. Incorporation of similar amounts of finely divided silica into the tablet subcoating is ineffective in preventing cracking and oil bleeding. The smoothing coating consists of a sugar layer formed by several applications of a sugar syrup over the tablet subcoating.

The vitamin E-active materials, e.g., tocopherols, can be incorporated into the multivitamin tablets of this invention in the form of a dry powder. Typical of the dry powders are combinations of vitamin E oil and a therapeutically inert carrier material such as hydrolyzed gelatin, finely divided silica, acacia and the like. It is to be understood that the use of finely divided silica as a carrier material for the vitamin E-active substance within the tablet is in no way related to or effects the inclusion of finely divided silica in the sugar coating according to the present invention. Generally, from about 35 percent to about 65 percent by weight of the oil is combined with the carrier. The preferred combinations for use in this invention are compositions containing about 50 percent vitamin E oil by weight combined with about 50 percent hydrolyzed gelatin by weight and about 60 percent by weight of vitamin E oil combined with about 40 percent finely divided silica by weight. The amount of vitamin E activity which can be incorporated into the multivitamin tablets according to the present invention can vary from about 10 units to about 30 units per tablet. The preferred amount of vitamin E activity is from about 15 units to about 30 units of vitamin E activity per tablet. Generally, a vitamin E content of less than 10 units of activity per tablet does not present stability problems and more than 30 units of vitamin E activity per tablet is not required in maintenance dose vitamin products.

The preferred vitamin E powders useful in preparing multivitamin tablets according to the present invention can be prepared by the process disclosed in U.S. Pat. 3,138,532, i.e., by spray drying an emulsion of the vitamin E-active compound, e.g., dl-tocopherol acetate, in hydrolyzed gelatin or by absorbing the oily vitamin E on finely divided silica.

The multivitamin tablets according to the present invention can contain, in addition to the other vitamins commonly included in such preparations, many of the conventional adjuvants of the prior art. Thus, for example, the multivitamin tablets of the present invention can contain inert binders such as pregelatinized starch, gum acacia, polyvinyl pyrrolidone and the like, lubricants such as, for example, an alkaline earth metal salt of a saturated fatty acid having a carbon chain length of from 12 to 18 carbon atoms. Calcium stearate is used as the lubricant in the preferred embodiment of the invention. The tablets may, in addition, contain other conventional ingredients such as antioxidants, preservers and inert diluents such as spray dried lactose, microcrystalline cellulose and the like.

The multivitamin tablets according to the present invention are prepared by direct compression which is simply the blending of flowable tablet materials into a homogeneous mass which is thereafter compressed into tablets. The success of a direct compression process is dependent on the tabletting characteristics of the active ingredients and excipients in the formula. All ingredients must be in a reasonably flowable and compressible form with a bulk density and particle size suitable for direct compression. Among the vitamin forms suitable for direct compression are dense grade niacinamide, free flow crystals of thiamine mononitrate and the like. Recent improvements in tablet excipients have resulted in greatly improved tablets produced by direct compression. In particular, spray dried acacia, direct tablet grade lactose, microcrystalline cellulose, spray dried blends of sugars and acacia and the like have proved very effective in direct compression formulations.

In general, the multivitamin tablets in accordance with the present invention are formed by blending the dry materials in a suitable mixer and compressing the homogeneous mass into tablets.

The tablets are sealed and sugar coated in a conventional manner, e.g., the tablets are sealed with a sealant such as shellac, shellac-polyvinylpyrrolidone, shellac-stearic acid or the like by application in a suitable solvent such as, for example, ethyl alcohol and given a subcoating with a mixture such as for example, gum arabic, sucrose, gelatin and water alternating with a dusting powder such as, for example, terra alba. The tablet surface is then smoothed by a coating of sugar which is applied as an aqueous syrup. After application of the smoothing coating, the tablets are polished with a polishing solution or polishing wax composition. The tablets may be colored in a number of ways such as, for example, building up color by having pigment dispersed in the subcoating material or by the use of a special coloring coating prior to the polishing step.

The tablets according to the present invention are stabilized against cracking and bleeding of vitamin E oil by the inclusion of from about 0.5 to about 5.0 percent and preferably from about 1.5 percent to about 2.5 percent weight to volume finely divided silica in the smoothing syrup of the sugar coating. The smoothing syrup is a light syrup containing preferably about 85 percent weight to volume of one or more sugars, e.g., sucrose and the like. In practice, the finely divided silica is completely dispersed in a smoothing syrup which is in turn applied to the tablets in a conventional manner.

The amount of finely divided silica which is dispersed in the smoothing syrup may vary somewhat depending on the concentration of the syrup. A sufficient amount of silica must be included in the smoothing syrup; however, to assure that the smoothing sugar layer contains a sufficient amount of silica to stabilize the tablet against cracking and oil seepage, e.g., from about 0.6 percent to about 6.0 percent by weight calculated on the weight of sugar deposited on the tablet surface. This amount can easily be converted to the amount of finely divided silica to be added to the smoothing syrup once the desired sugar concentration of the syrup is established.

As utilized herein, the term "silica" refers to silicic acid, a silicate or silicon dioxide. A preferred product is a microfine silica gel marketed under the tradename Syloid 244 by Davision Chemical, Baltimore, Md., a division of W. R. Grace and Company.

In order to determine the stability of tablets prepared in accordance with the present invention, sample tablets were stored at about 55° C. for one month and visually examined for cracking and oil seepage. No cracking of the sugar coating or oil seepage was noted at the end of this time.

The following examples illustrate the invention which is not limited to the specific embodiments shown therein.

EXAMPLE 1

The following formulations were utilized in forming multi-vitamin tablets.

The riboflavin, pyridoxine hydrochloride and calcium pantothenate were passed through a Fitzpatrick mill equipped with a No. 2 screen. The resulting material was then admixed and thoroughly blended with the remaining ingredients listed in the formulations. Thereafter, the homogeneous mass was compressed into tablets weighing between 269 and 306 mg. for formulations A, B and C, and between 605 and 620 mg. for formulations D, E and F.

The tablets thus formed were sealed with shellac and subcoated with acacia syrup alternating with a terra alba dusting powder. The tablets from each formulation were divided equally into two groups. A first group of tablets was smoothed, waxed and polished utilizing conventional procedures. A second group of tablets was similarly treated with the exception of the addition of about 2.0 percent by weight microfine silica gel (Syloid 244) to the the smoothing syrup, e.g., U.S.P. syrup.

The finished tablets were maintained at 55° C. for 30 days. At the end of this storage period the tablets, from all formulations, which had been finished utilizing a smoothing syrup containing microfine silica, without exception, showed no change in appearance. In contrast, and without exception, the tablets which had been finished with a conventional smoothing syrup exhibited cracking of the sugar coating and oil seepage. It can readily be seen, therefore, that the inclusion of microfine silica in the smoothing syrup rendered the multivitamin tablets prepared stable in regard to oil seepage and cracking of the sugar coating.

EXAMPLE 2

Four groups of 3000 tablets each having a formulation corresponding to that of Formula A in Example 1 were given a sealing coating as follows:

Group I.—3000 tablets were given a conventional smoothing coating consisting of several applications of U.S.P. syrup (85 percent weight to volume sucrose in distilled water). The finished tablets each weighed 455 mg.

Group II.—3000 tablets were coated with U.S.P. syrup containing 0.5 percent weight to volume Syloid 244. This coating was in turn overcoated with three additional coatings of U.S.P. syrup. The finished tablets each weighed 458 mg.

Group III.—3000 tablets were coated in an analogous manner to Group II with the exception that the first coating contained 2.0 percent weight to volume Syloid 244. The finished tablets each weighed 460 mg.

Group IV.—3000 tablets were coated in an analogous manner to Group II with the exception that the first coating contained 4.0 percent weight to volume Syloid 244. The finished tablets each weighed 468 mg.

The tablets were stored at 55° C. for 30 days. At the end of this time, the tablets of Group I showed cracking of the sugar coating and pronounced oil seepage. The tablets of Groups II, III and IV were unchanged.

Tablets from Groups II, III and IV showed no oil seepage or cracking after storage at 37° C. for six months, at room temperature for eight months and at 5° C. for eight months.

| Ingredient | Parts by weight | | | | | |
|---|---|---|---|---|---|---|
| | A | B | C | D | E | F |
| Thiamine mononitrate, fine granular | 2.20 | 2.20 | 2.20 | 11.0 | 11.0 | 11.0 |
| Riboflavin | 2.75 | 2.75 | 2.75 | 11.0 | 11.0 | 11.0 |
| Pyridoxine HCl | 1.10 | 1.10 | 1.10 | 5.5 | 5.5 | 5.5 |
| Vitamin $B_{12}$ (0.1 percent in gelatin) | 1.60 | 1.60 | 1.20 | 6.25 | 6.25 | 6.25 |
| Niacinamide, dense | 21.00 | 21.00 | 21.00 | 110.00 | 110.00 | 110.00 |
| d-Calcium pantothenate | 1.50 | 1.50 | 1.50 | 30.00 | 30.00 | 30.00 |
| Ascorbic acid (90 percent granulation) | 85.60 | 85.60 | 85.60 | | | |
| Sodium ascorbate (95 percent granulation) | | | | 257.00 | 257.00 | 257.00 |
| Vitamin A acetate powder—500 million units/gm | 13.00 | 12.50 | 12.50 | 62.5 | 6.25 | 62.5 |
| Vitamin $D_2$ powder 850 million units/gm | 0.50 | 0.50 | 0.50 | 0.60 | 0.60 | 0.60 |
| Microcrystalline cellulose | 50.00 | 50.00 | 50.00 | | | |
| Dicalcium phosphate, anhydrous, unmilled | 60.00 | 60.00 | 44.05 | 68.65 | 52.85 | 84.40 |
| Stearic acid | 4.00 | 4.00 | 4.00 | 5.25 | 5.25 | 5.25 |
| Vitamin E, 50 percent (hydrolyzed gelatin base) | 63.00 | | | | 63.00 | 31.5 |
| Vitamin E, 60 percent (microfine silica base—Syloid 244) | | 26.26 | | | | |
| Vitamin E, 33 percent granulation (microfine silica base—Syloid 244) | | | 47.70 | 47.25 | | |
| Tablet weight (mg.) | 306 | 269 | 275 | 615 | 615 | 615 |

EXAMPLE 3

This example demonstrates that the finely divided silica is only effective in preventing cracking of the sugar coating and oil seepage when it is incorporated into the smoothing coating.

Tablets as utilized in Example 2 were prepared as follows:

Group I.—3250 tablets: as a control these tablets were given a sealing coating of shellac and a subcoating by alternating acacia syrup and terra alba dusting powder in a conventional manner. The smoothing coating was U.S.P. syrup as applied in Example 2.

Group II.—3250 tablets: these tablets were prepared in a manner analogous to Group I except that an amount of Syloid 244 equal to about 5 percent by weight of the finished tablet was applied in the subcoating by combining it with the terra alba dusting powder. The smoothing coating was U.S.P. syrup as applied in Example 2.

Group III.—3250 tablets: these tablets were prepared in an analogous manner to Groups II, III and IV in Example 2 utilizing 2.0 percent weight to volume Syloid 244 in the smoothing syrup.

Storage at 55° C. resulting in a substantial amount of oil on the tablet surface in Groups I and II. Similar oil seepage and cracking of the tablet coating was noted after two weeks storage at 45° C. The tablets of Group III remained unchanged under these conditions.

What is claimed is:

1. In a method of producing a stable, sugar-coated multivitamin tablet, the steps of which include
   (a) forming an inner core of multivitamins containing from about 10 units to about 30 units of vitamin E activity,
   (b) coating said inner core with a sealant and
   (c) coating the thus-sealed core with a smoothing syrup; the improvement which comprises incorporating from about 0.5% to about 5% weight to volume of finely divided silica gel in the smoothing syrup to render said tablet stable against oil seepage and cracking of the sugar coating.

2. The method of claim 1 wherein said tablet smoothing syrup comprises an aqueous syrup containing about 85% weight to volume sucrose.

3. The method of claim 1 wherein said tablet smoothing syrup contains from about 1.5% to about 2.5% weight to volume finely divided silica.

4. A sugar-coated multivitamin tablet, stable against oil seepage and cracking, comprising
   (a) a multivitamin containing inner core with from about 10 units to about 30 units of vitamin E activity, said inner core coated with a sealant, and
   (b) an outer coating comprising sugar and from about 0.6% to about 6.0% by weight, based on the weight of said sugar coating, of finely divided silica gel.

References Cited
UNITED STATES PATENTS

| | | | |
|---|---|---|---|
| 2,756,177 | 7/1956 | Cannalonga et al. | 424—284 |
| 2,841,528 | 7/1958 | Myhre | 424—284 |
| 3,247,064 | 4/1966 | Maekawa et al. | 424—284 |

ALBERT T. MEYERS, Primary Examiner

V. D. TURNER, Assistant Examiner

U.S. Cl. X.R.

424—284